(12) United States Patent
Tencer et al.

(10) Patent No.: US 7,387,327 B2
(45) Date of Patent: Jun. 17, 2008

(54) STRUCTURE AND SYSTEM FOR OCCUPANT PROTECTION IN A SIDE IMPACT AUTOMOBILE COLLISION AND METHODS OF USE THEREOF

(75) Inventors: Allan Tencer, Seattle, WA (US); Robert Philip Kaufman, Seattle, WA (US); Charles Newman Mock, Seattle, WA (US)

(73) Assignee: University of Washington, Seattle, WA (US)

( * ) Notice: Subject to any disclaimer, the term of this patent is extended or adjusted under 35 U.S.C. 154(b) by 270 days.

(21) Appl. No.: 11/165,945

(22) Filed: Jun. 24, 2005

(65) Prior Publication Data

US 2006/0290160 A1 Dec. 28, 2006

(51) Int. Cl.
*B60N 2/06* (2006.01)
*B60N 2/427* (2006.01)
(52) U.S. Cl. ............... 296/68.1; 296/65.11; 296/65.13; 296/187.12; 280/751; 297/216.1; 297/216.18
(58) Field of Classification Search .............. 296/68.1, 296/65.02, 65.11, 65.13, 187.12; 280/748, 280/751, 752; 297/216.1, 216.18, 216.16, 297/216.17, 464, 487, 488
See application file for complete search history.

(56) References Cited

U.S. PATENT DOCUMENTS

| | | | |
|---|---|---|---|
| 3,271,071 A * | 9/1966 | Tabor | 297/375 |
| 6,142,563 A * | 11/2000 | Townsend et al. | 297/216.1 |
| 6,592,166 B2 * | 7/2003 | Motozawa | 296/68.1 |
| 6,786,534 B1 | 9/2004 | Peng | 296/187.08 |
| 6,851,740 B1 | 2/2005 | Peng | 296/187.12 |
| 2002/0195838 A1 * | 12/2002 | Motozawa | 296/189 |
| 2005/0127645 A1 * | 6/2005 | Smith et al. | 280/730.2 |
| 2006/0202513 A1 * | 9/2006 | Matsuda | 296/187.12 |
| 2007/0063542 A1 * | 3/2007 | Fong | 296/187.03 |

FOREIGN PATENT DOCUMENTS

| | | |
|---|---|---|
| DE | 42 12 091 A1 | 10/1993 |
| DE | 195 16 013 A1 | 5/1996 |
| DE | 195 17 407 A1 | 6/1996 |
| EP | 1 266 804 A2 | 12/2002 |
| EP | 1 070 657 B1 | 8/2003 |

* cited by examiner

*Primary Examiner*—Jason S Morrow
(74) *Attorney, Agent, or Firm*—Woodcock Washburn LLP

(57) ABSTRACT

A system for managing an occupant in an occupant compartment of an automotive vehicle, a structure for use in an automobile, and methods of use thereof are provided for protecting an occupant during a near side impact collision.

27 Claims, 3 Drawing Sheets

Front view

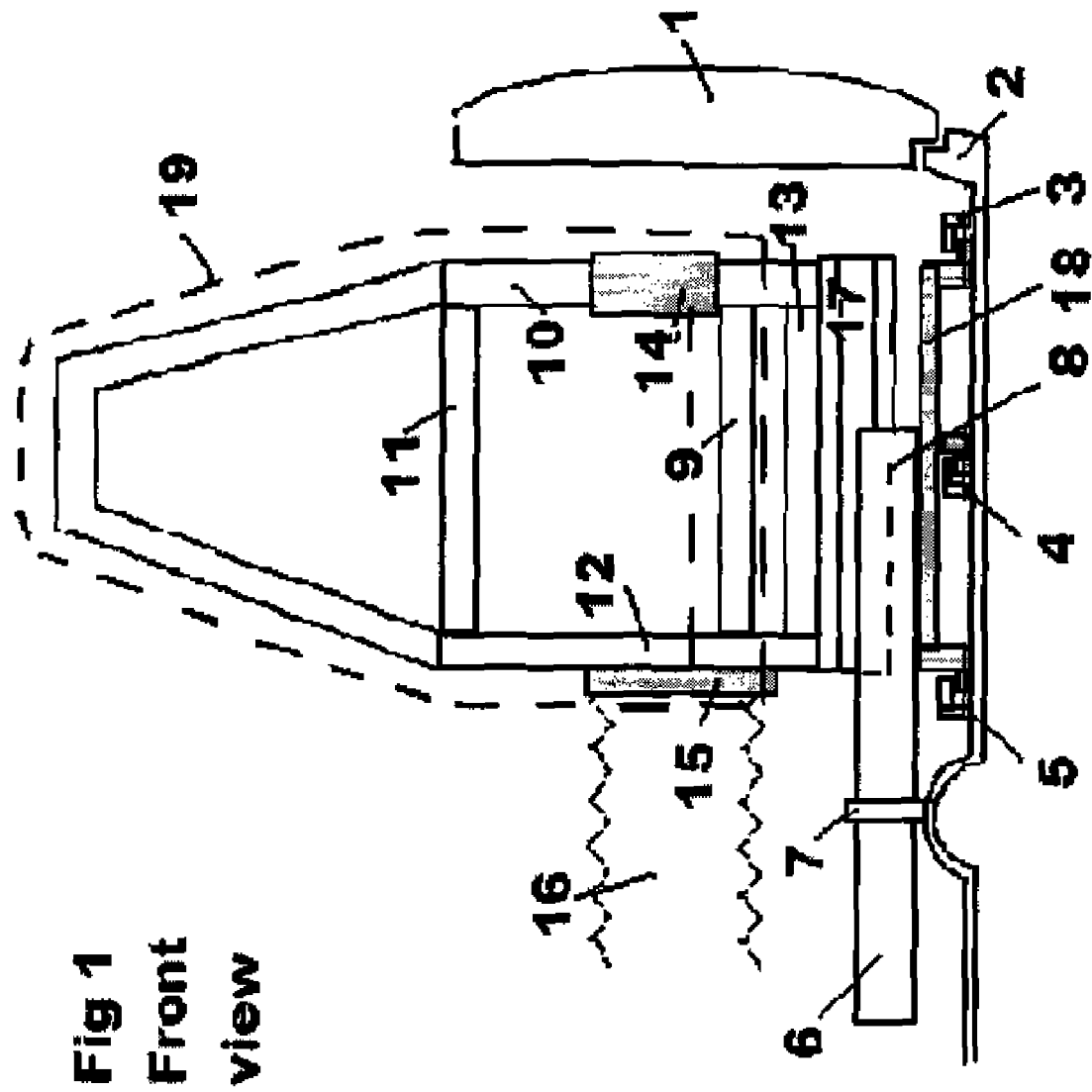

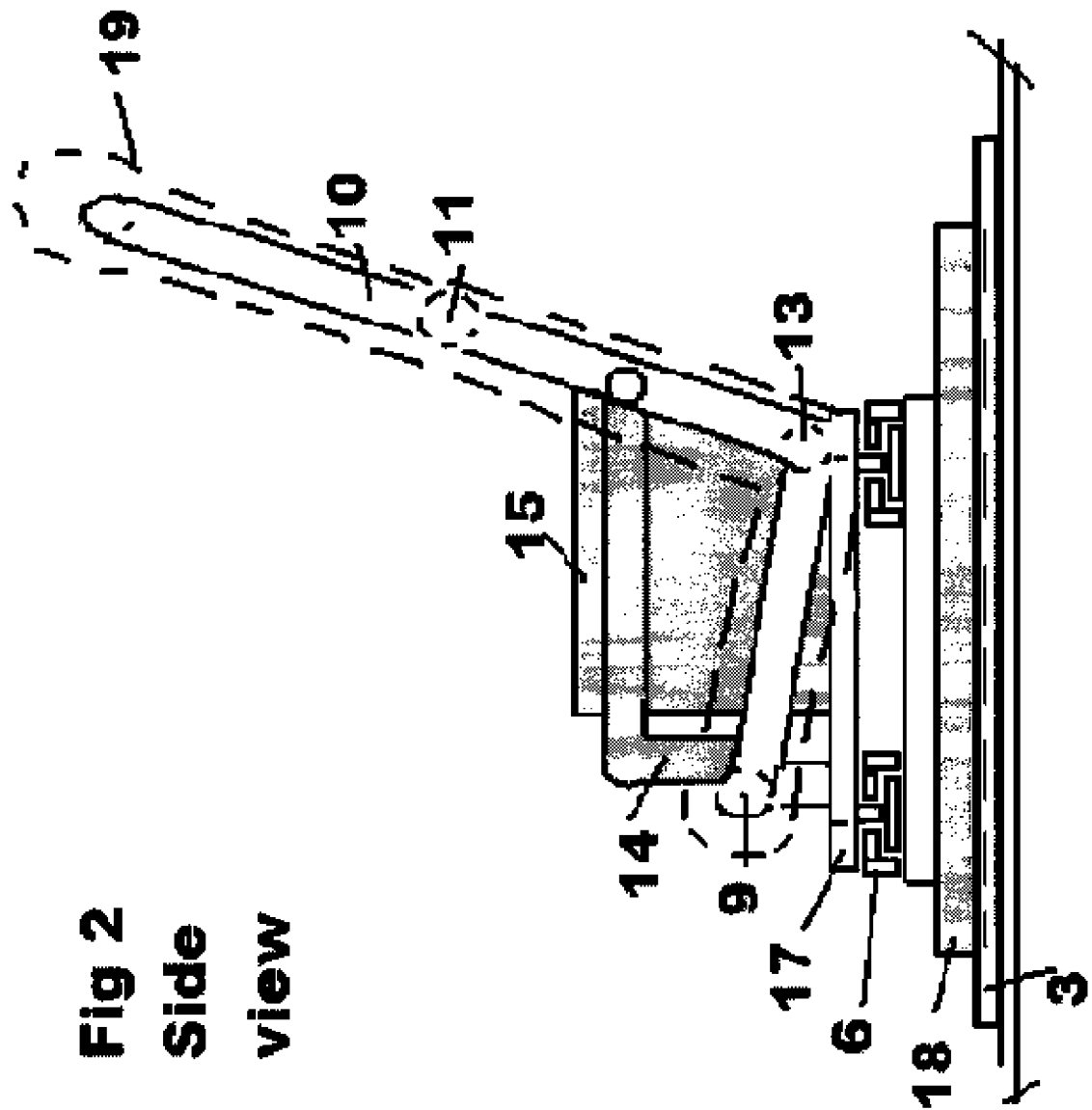

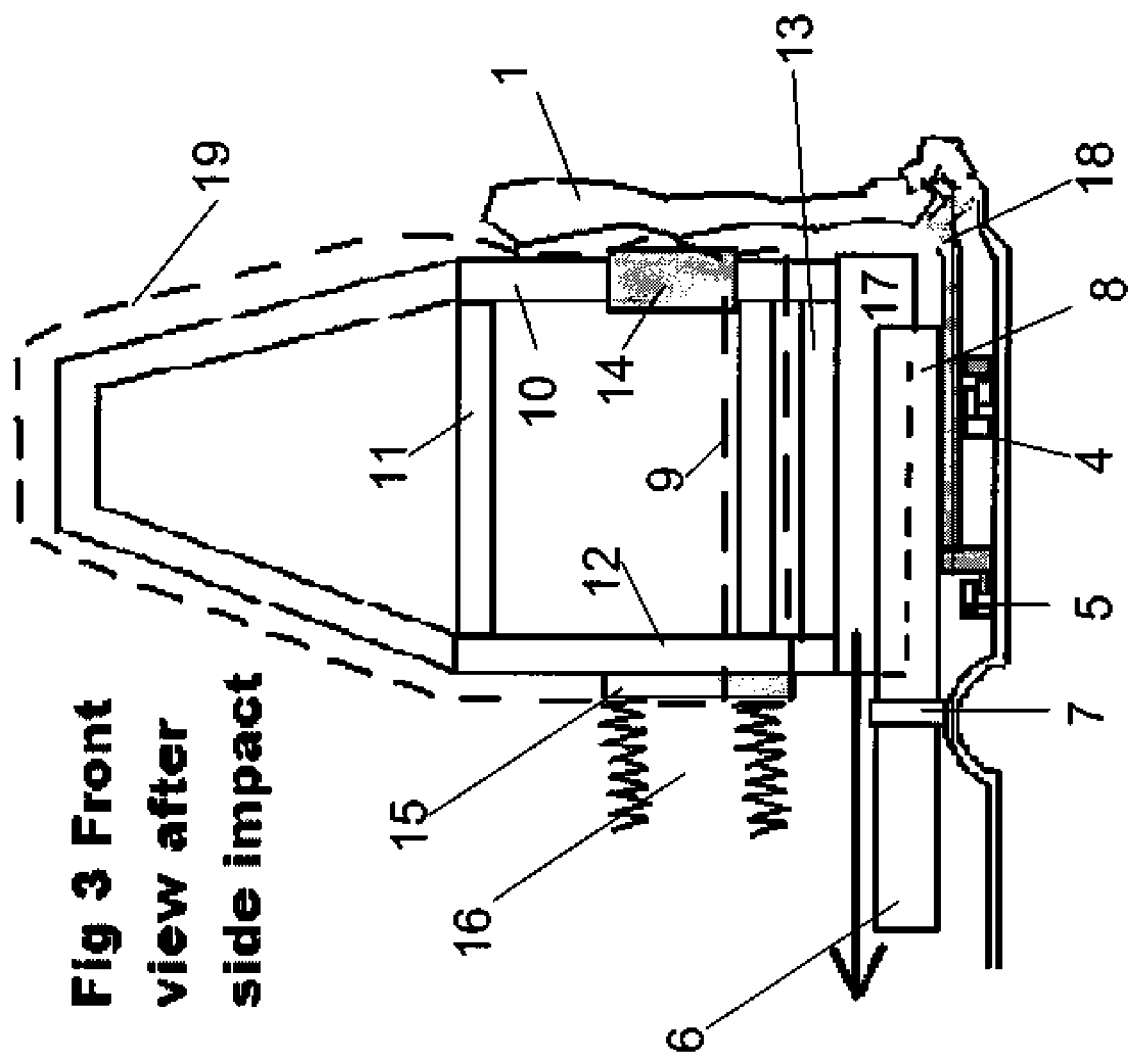

STRUCTURE AND SYSTEM FOR OCCUPANT PROTECTION IN A SIDE IMPACT AUTOMOBILE COLLISION AND METHODS OF USE THEREOF

STATEMENT OF GOVERNMENT SUPPORT

This invention was made with government support under Grant No. R49/CCR021729-03 from the Department of Health and Human Services, Center for Disease Control and Prevention and Grant No. DTNH22-99-H-17444 from the United States Department of Transportation. The United States Government has certain rights in this invention.

FIELD OF THE INVENTION

The present invention relates to a system for managing an occupant in an occupant compartment of an automotive vehicle and a structure for use in an automobile for protecting an occupant during a near side impact collision, and methods of use thereof.

BACKGROUND OF THE INVENTION

Side impact crashes represented, in 2002, 26% of all fatal collisions (second only to frontal crashes) with an estimated total of 782,900 nonfatal and 9812 fatal injuries. Reports from a survey of the National Automotive Sampling System (NASS) showed that injuries to the chest occurred in 39.7% of surviving occupants, followed by injuries to the head (25%), the pelvis (11.7%), and the abdomen (8.4%). In a study of the 119 crashes currently entered in the Crash Injury Research and Engineering Network (CIREN) database, 71 (60%) of occupants had pelvic fractures of at least AIS 2 (Abbreviated Injury Score). The mortality rate from motor vehicle induced pelvic injury ranges from 8.6% to 50%, with 25%-35% of survivors having unsatisfactory results after treatment. Compared to patients in motor vehicle crashes without pelvic injury, those with pelvic injury were significantly more injured, had higher blood loss, longer hospital stays, more genitourinary injuries, and higher mortality rates.

LC-I (lateral compression) pelvic fractures, involve structures in direct contact with the incoming door. LC-I fractures are stable, may be treated non-surgically and usually result in little internal disruption. In contrast, LC-III fractures involve not only injury to structures such as the sacrum or iliac wing and pubic ramus on the door side, but also structures on the opposite side. The LC-III fracture is highly unstable, involves rupture of pelvic area blood vessels, has significant associated internal hemorrhage, and damage to internal organs, and must be treated surgically by stabilization of both the anterior and posterior pelvic ring. Operative treatment of pelvic injuries, particularly open reduction and internal fixation is associated with significant surgical risk including deep infection, nerve injuries, and malreduction. In a near side impact collision, pelvic fracture has been described as occurring from direct contact with the intruding door. Further studies have shown that LC-III pelvic fracture occurs on the side opposite the door. This type of pelvic fracture implies contact with some other structure in the vehicle. In several CIREN crash investigations of near-side impacts, evidence was found of hard contact of the pelvis through the belt buckle into the center console.

Crash investigations and laboratory testing have also shown that several factors can result in serious injury to the occupant's chest and abdomen. Specifically, the armrest can act as a punch, intruding into the chest wall causing rib fracture and internal organ injuries. In addition, in many impacts, where a passenger car door is hit high, near its upper border by the front end structures of an SUV or truck, the top of the door tilts inward, accentuating the contact of the door with the occupant's chest. Since the chest is softer than the pelvis, the door and armrest will intrude into the chest before the door contacts the pelvis and starts to accelerate the occupant away.

A need exists in the art to better protect an occupant of an automotive passenger compartment from serious injury resulting from a near side impact collision when the striking vehicle is a truck or sport utility vehicle which impacts the struck vehicle at varying elevated positions and angles. A need exists in the art further to reduce serious pelvic fractures and thoracic injuries to vehicle occupants from near side impact collisions.

SUMMARY OF THE INVENTION

The present invention, in one embodiment, provides a structure for use in an automobile for protecting an occupant during a near side impact collision. An illustrative embodiment comprises a lateral seat track attached to the automobile and oriented substantially perpendicularly to a central longitudinal axis of the automobile. An occupant seat is operatively coupled to the lateral seat track such that, during a near side impact collision, the occupant seat will move laterally away from an impacting vehicle and toward the central longitudinal axis. A limiting barrier is disposed adjacent to the occupant seat and is configured to impede the lateral movement of the occupant seat during the collision.

Other features of the present invention are described below.

BRIEF DESCRIPTION OF THE DRAWINGS

FIG. 1 shows a front view of a structure for use in an automobile for protecting an occupant during a near side impact collision embodying the present invention.

FIG. 2 shows a side view of a structure for use in an automobile for protecting an occupant during a near side impact collision embodying the present invention.

FIG. 3 shows a front view of a structure for use in an automobile for protecting an occupant during a near side impact collision embodying the present invention after side impact.

DETAILED DESCRIPTION OF ILLUSTRATIVE EMBODIMENTS

In a near side impact collision, pelvic fracture of an automobile occupant can occur from direct contact with the intruding door. Bilateral LC-III fractures, which include fractures on the side opposite the door, imply contact with some other structure in the vehicle. In several CIREN crash investigations of near-side impact collisions, evidence was found for hard contact of the pelvis through the belt buckle into the center console. Since it appears that the center console can play a role in some pelvic fractures, the secondary load from pelvic contact can be reduced by changing the console structure so that it yields under loading by the pelvis. Further extending this concept, if the seat were permitted to move laterally in a controlled manner into the space occupied by the crushed console, then primary impact loads on the pelvis from door contact can also be reduced. In addition, if the armrest is fixed to a side frame on the seat instead of to the door, then the door will contact the seat side frame, protecting the occupant's chest and abdomen.

The present invention provides, in several embodiments, a structure for use in an automobile for protecting an occupant during a near side impact collision, a system for managing an occupant in an occupant compartment of an automotive vehicle in an event of a near side impact collision, and a method for managing an impact load from a near side impact collision. A near side impact collision can occur in a two vehicle collision at an intersection where a struck vehicle is hit approximately perpendicular to the door by a striking vehicle thus compromising the integrity of the occupant compartment of the struck vehicle. The collision can deform the door into the occupant compartment and cause serious injury to the occupant. The structure for use in an automobile for protecting an occupant during a near side impact collision reduces injury to a vehicle occupant resulting from a near side impact collision between two vehicles by avoiding or reducing direct contact of the door against the body of the occupant. In existing occupant seating systems, the intruding door can cause serious injury to the occupant's chest and pelvis from direct contact with the door and the arm rest on one side and contact with the center console on the other side. Since the injury is caused by a direct intrusion of the door, an embodiment of the present invention provides a structure for use in an automobile for protecting an occupant during a near side impact collision that displaces the occupant away from the incoming door panel using the contact between the door panel and the seat structure instead of the door panel against the occupant's body. Since the center console can play a role in some pelvic fractures, the secondary load from pelvic contact with the center console can be reduced by changing the console structure, so that it yields under loading by the pelvis. Furthermore, if the seat can move laterally in a controlled manner into the space occupied by the crushed console, then primary impact loads on the pelvis from contact with the door can also be reduced.

A structure for use in an automobile for protecting an occupant during a near side impact collision is provided to reduce direct contact of the door against the body of an occupant and resulting injury in a near side impact collision between two vehicles. The structure prevents or reduces injury to the occupant's chest and pelvis caused by direct intrusion of the door. The structure provides three subsystems: (1) An occupant seat mounted on a frame platform that maintains the geometry and integrity of the seat and the occupant space upon contact by the door during a side impact; (2) A seat track attached to the frame platform to allow the frame and seat to translate laterally; The occupant, frame, and seat contact a limiting barrier comprising a door side panel and a center console side panel that compress or crush upon impact absorbing the lateral translation of the seat and frame platform; and (3) A restraint to ensure that the occupant remains with the seat as it translates.

FIGS. 1, 2, and 3 show aspects of a structure for use in an automobile for protecting an occupant during a near side impact collision. FIG. 1 is a front view of a driver's seat. FIG. 2 is a side view of the same seat. FIG. 3 shows the possible configuration of the vehicle interior after a side impact collision. In FIG. 1, standard components of an automotive vehicle include the driver's door 1 in contact with the floor sill 2. Forward/rear adjustable seat tracks are shown for the right track 3 and left track 5. The components of the structure embodied in the present invention further comprise three aspects.

A first aspect of the structure maintains the geometry and integrity of the seat and therefore the occupant space as it is contacted by the door during a side impact. Depending on the nature of the collision and the size of the striking vehicle, the seat and supporting frame members maintain the rigidity of the seat and present sufficient surface to accommodate the highly variable contact forces transmitted from the door as it is deformed by the striking vehicle. These forces result in displacement of the seat laterally. This subsystem comprises the seat forward/rear platform 18, the seat platform 17, the seat, right 10 and left 12 vertical members, the lower 13, middle 9, and upper 11 cross members, which together make up the seat structure. An occupant seat is mounted on a rigid seat platform 17. The rigidity of the occupant seat is maintained by the seat platform 17 which is attached to the right seat vertical member 10 and the left seat vertical member 12. The seat platform 17, right 10 and left 12 seat vertical members are further reinforced by the lower cross member 13, the middle cross member 9, and the upper cross member 11. In one embodiment, the reinforcing members are external to the occupant seat. Alternatively, various means of internal reinforcement of the occupant seat can support the rigid frame members as the occupant seat is mounted on the seat platform to maintain an occupant space within an occupant compartment. The occupant seat can be rigid depending upon the amount of internal reinforcement of the seat itself and can be mounted directly to the lateral track. FIGS. 1, 2, and 3 show an embodiment for internal reinforcement of the occupant seat 19.

A second aspect of the structure allows the seat to translate laterally toward the center of the occupant compartment upon a near side impact collision. The subsystem for lateral translation comprises the lateral seat track 6 held by the lateral seat track retainer 7 and attached to the seat platform 17. The seat track 6 guides the seat platform 17 laterally. An additional center forward/rear seat track 4 and shear bolts 8 control the force at which the seat starts to slide. The front (not shown) and rear console side panels 16 provide limiting barriers which crush and absorb energy as the seat displaces laterally so that the lateral motion of the seat is controlled. The center seat track 4 helps to stabilize the structure in anticipation of the left seat track 3 being deformed during the collision. In one aspect, the lateral track 6 supporting the seat frame 17 is cantilevered to allow for deformation of the seat forward/rear platform 18 and the left seat track 3 upon collision impact without displacing the lateral track. The cantilevered lateral track allows the seat frame and seat to translate laterally without displacement to or distortion of the lateral track upon side impact collision. A "cantilevered lateral track" refers to a projecting track that is supported and restrained at one end only. In a further aspect, the track extends about one half the width of the seat beyond the edge of the seat. During a side impact the floor tends to buckle so a full width track would probably distort, making sliding of the seat problematic.

A third aspect of the structure ensures that the occupant remains with the seat as the seat translates laterally during a near side impact collision. An occupant restraint apparatus is provided which comprises a seat arm rest/occupant guard 14 which hinges with the right vertical member 10 to allow the occupant to enter and exit the seat. The console/seat vertical panel 15 forms the occupant's side of the center console and absorbs the impact of the seat and occupant toward the center of the passenger compartment upon impact and against the limiting barrier, e.g., the center console of a crushable material. The console/seat vertical panel 15 prevents movement of the occupant out of the seat and towards the center of the passenger compartment. The seat arm rest/occupant guard 14 prevents the occupant from moving towards the door, and prevents direct contact of the occupant with the door. The armrest, instead of being a source of protrusion on the door panel, now moves with the seat and the occupant. In addition, a standard 3-point lap and shoulder belt is attached to the seat to further restrain the occupant in the standard manner.

FIG. 3 shows a front view of the structure after side impact collision. The door 1 has impacted the rigid seat frame 10 and the occupant impact guard 14 to overcome the shear release bolts 8 and to move the seat frame laterally along the lateral seat track toward the center of the occupant compartment. The seat frame 12 has contacted the console/seat vertical panel 15. The force of the lateral movement is absorbed by the console transverse crushable panel 16.

Studies of side impact injury reduction have focused on several aspects to improve safety. Increasing the rigidity of the door using a side impact beam reduces its intrusion into the occupant space. However, since the position of the beam is aligned with the height of the typical passenger vehicle bumper, it is less effective for higher bumpers such as those of SUV's or light trucks. There is also a limit to the increase in strength of the door that can be gained by reinforcing it, considering the effects of added weight. In addition, it is important to allow some crush of the door to absorb energy of impact, otherwise the occupants will be exposed to high acceleration levels. As the door becomes stiffer it becomes necessary to reinforce the A pillar (between the door and the front window) and the B pillar (between the front and rear doors) and the floor sill to accommodate the stronger door, further increasing the weight of the vehicle. Nonetheless, door beams are now required by federal law in all vehicles. While this has decreased intrusion, 25-35 cm of intrusion has been observed in actual crashes, partly because of the mismatch in bumper height and vehicle mass when a light truck or SUV hits a passenger car.

Considerable study has been given to different types of padding of the door, with many vehicles now offering a thoracic airbag that deploys from the side of the seat to reduce the concentration of force against the occupant's chest. Studies have show debatable effectiveness of these devices. In one study, measurements in crash dummies during federal side impact crash testing showed that accelerations were reduced only about 15%. More importantly, acceleration from side impact crash stayed above levels known to cause serious thoracic injury. There is concern that a thoracic airbag, firing into the chest of an out-of-position occupant, such as one leaning against the door, may in fact cause rib fracture. An alternative is adding padding to the door. This in general distributes the forces over the chest but does not decrease door intrusion and may increase compression of the rib cage.

Finally, studies have considered widening the space between the occupant and the door. If the space were widened by 25-35 cm. it is possible to prevent much of the intrusion of the door into the occupant space in many side impact crashes, reducing injury potential. However, practical considerations, such as limits to road width make this approach impractical. In one embodiment of the invention, additional space in the center of the vehicle between the two seats is available which is not used currently for side impact protection. A structure for use in an automobile for protecting an occupant during a near side impact collision, a system for managing an occupant in an occupant compartment of an automotive vehicle in an event of a near side impact collision, and a method for managing an impact load from a near side impact collision utilize the space in the center of the vehicle to maintain an occupant space during the crash. In further embodiments, the structure, system, and method comprise the following components, which can be designed in a number of ways.

a) A rigid perimeter frame for the seat that allows the door to contact the occupant seat instead of the occupant and the seat maintains its original shape without crushing. The rigid perimeter frame can be external or internal to the occupant seat. This includes a moveable armrest/occupant chest guard which ensures that the door contacts the seat frame and not the occupant's chest or pelvis.

b) A cantilevered track that allows the seat to displace laterally when pushed by contact between the door and the seat frame. Many alternative designs can be envisioned. In one embodiment, the track is a simple guide slot. In a further embodiment, the track extends about one half the width of the seat beyond the edge of the seat. The seat is therefore cantilevered from the track. During a side impact the floor tends to buckle so a full width track would probably distort, making sliding of the seat problematic.

c) A mechanism to ensure some resistance to lateral sliding so that the seat maintains its position during normal use or in other crash directions. In one embodiment, resistance to lateral sliding is created by bolts which extend through the slotted track guides with nuts torqued to a specified value, thereby providing frictional resistance to lateral movement of the seat.

d) A crushable center console allows the seat to displace laterally into the center of the vehicle and absorbs the lateral translation of the seat and platform.

The following examples of specific embodiments for carrying out the present invention are offered for illustrative purposes only, and are not intended to limit the scope of the present invention in any way.

The disclosures of all publications, patents and patent applications cited herein are hereby incorporated by reference in their entirety.

Exemplary Embodiment

EXAMPLE 1

Experimental Testing

SINCAP side impact tests performed by the National Highway Traffic Safety Administration (NHTSA) on vehicles from 1999-2003 were studied from data available at www.dms.dot.gov, docket 3835, where complete reports of each test are posted. A total of 165 separate tests were analyzed. From the data, mean time histories of door velocity and pelvic acceleration were generated to provide a comparison from experiment and modeling shown herein to data from controlled crashes.

The experimental apparatus consisted of a pendulum carrying a pre-crushed door, a US DOT SID dummy, a seat, and a mechanism to stop the motion of the pendulum after dummy impact. A door from a 1997 Toyota Celica was selected from wrecking yard vehicles (Pull-Apart, Lynnwood Wash.) that had sustained an approximately 90 deg side impact with predominant deformation of the door located in the rear half. A crushed door is necessary to simulate the actual door stiffness during contact with the occupant.

The apparatus consists of a simple pendulum composed of 2, 4.9 m long sections of 0.15 m×0.15 m×0.006 m (6"×6"×¼") aluminum angle bolted together. One end was mounted through a hinge to a frame bolted to the ceiling of the lab. The other end was pulled upwards by a winch and cable system. The door was mounted to the pendulum through an apparatus that could change its orientation both vertically and horizontally. The top of the arm rest was positioned level with the pelvis of the dummy at contact. Two springs which could be precompressed were used to stop the forward travel of the pendulum after contact with the dummy. From 165 US DOT New Car Assessment Program (NCAP) tests, the mean door peak velocity was 8.1 m/sec (range 2.8-13.4 m/sec) and maximum intrusion was 34.4 cm, with a mean initial door to dummy clearance of 15.1 cm giving a mean door-to-dummy contact stroke of about 19 cm (11). Pendulum contact velocity was 6.3 m/sec with a door-to-dummy stroke of 15 cm.

USDOT SID dummy (S/N 344 calibrated by Robert Denton, Inc, Michigan) was selected for the experiment because it is used in the SINCAP tests and therefore allowed a direct comparison of TTI and pelvic acceleration from this experiment to SINCAP full scale test results. The dummy was restrained with a lap and shoulder belt fixed to the seat. Accelerometers were fixed to the T4, T8, and T12 rib levels and at the pelvis in the standard mounting positions on the dummy.

The seat was designed to test the configurations of a standard fixed seat, which crushed during impact with and without a console, as well as a laterally translating seat with no console. The seat frame was constructed so the half away from the door was a rigid frame and the half towards the door was a moveable frame which could slide over the rigid half. This allowed the half of the seat frame closest to the door to simulate seat crushing during impact. The rigid part of the seat frame was mounted onto a slotted track which allowed lateral (Y) displacement. To simulate the fixed seat-no console condition, the seat was locked to the lateral track and the moveable half of the seat frame was allowed to slide into the rigid half frame. To simulate the fixed seat-with console condition, an aluminum plate simulated the vertical plane of the console into which the hip might be compressed and was bolted to the seat frame. Finally, to simulate the translating seat, the moveable seat half frame was locked in its outmost position, and the whole seat allowed to slide on the lateral track. In this configuration, the seat frame retains its original dimension and the whole seat slides laterally. The seat track was designed to accommodate 25 cm of lateral displacement. This was the mean intrusion distance found from the CIREN crashes studied and also represents a common dimension between seats in many vehicles.

Data collection was performed at 10 KHz (National Instruments, Austin, Tex). High speed video (Kodak Ectapro, San Diego, Calif.) running at 1000 frames/sec was used capture each impact. Data from the accelerometers was filtered using the FIR 100 filter. Maximum and minimum accelerations from each test were determined from the time history and the three conditions were compared using a nonparametric Wilcoxon signed rank test small samples with a significant difference set at $p<0.05$. The pendulum tests were reproducible with a coefficient of variation in peak pelvic acceleration of 0.074 (standard deviation/mean). With a fixed seat and no console, the maximum pelvic acceleration due to contact from the door was 28.5 g and the minimum (due to the lap belt) was -3.3 g. With a console plate added, the maximum acceleration was 24.8 g (not significantly different) while the minimum acceleration due to contact with the console increased to -10.5 g ($p<0.05$). With a seat allowing lateral movement upon impact, with no console, the maximum pelvic acceleration decreased to 15.3 g ($p<0.05$) and minimum acceleration remained at -3.8 g.

EXAMPLE 2

Development of a MADYMO Model of the Pendulum Side Impact

A USDOT SID version of a MADYMO© model was developed to allow direct comparison with the previous results of the USDOT SID. ES-2, BIOSID and SIDiis versions of the model were used because of their reported greater biofidelity (19,20).

The door was modeled by first testing its local stiffness in the following manner. The door was mounted horizontally onto a cradle with its interior surface facing upwards. A grid, 2 cm square was drawn on the surface of the door and the center point of each grid located at the crossing of diagonals on each square. The door and cradle was mounted to the table of a materials testing device. A 2.5 cm diameter cylindrical load tip was screwed to the base of the load cell. The door was tested nondestructively at low loading rate. Door interior panels, made of ABS, are relatively insensitive to loading rate and can be characterized by quasistatic or low rate loading (21). The tests were run under displacement control to a maximum displacement of 2 cm at all grid center point locations. The data was collected, at a sampling rate of 1000 Hz, force-deflection data were plotted, and a stiffness map of the interior door surface panel created. In addition, the displacement at which the load first increased from zero was defined as the contact point, from which a geometric profile map was plotted.

The door was represented in the model as a series of translational joints of prescribed stiffness based on the mechanical testing described above with a finite element mesh of shell elements as the door contact surface to the dummy. The door surface, being coarser, was selected as the master surface and finite element meshes were created to coat around the dummy's ellipsoid contact surfaces. The seat consisted of shell elements, with a center console plane, fixed to the reference space. The base of the seat was connected to the reference space by a joint allowing translation in the Y (lateral) direction, representing the seat track. The USDOT SID dummy was restrained by a finite element lap belt. The seat/dummy friction coefficient was set at 0.3. Both the model and experiment represented a passenger's side impact.

For the case of the standard fixed seat, the seat stiffness (for door contact) was $1\times10^2$ N/mm, the seat joint was locked (no translation), a console plane was added, and the door configuration was as shown previously. For the translating seat, the seat stiffness was increased to $1\times10^3$, the seat joint was unlocked with a frictional coefficient of 0.3, along with a shear release load of 5000N, and the door panel was flat with a narrow arm rest. The pelvic contact forces were compared for the two cases studied.

For this part of the study, focusing on pelvic loads, results from USDOT are presented to show conceptually how the seat and the environment can be altered. Results with other dummies were similar. A comparison of pelvic accelerations between the model and experiment and with mean data from SINCAP tests was performed. A small amount of drag was added in the model to reflect friction in the experimental apparatus. With this, the model and experiment were in very good agreement, both for door velocity and pelvic acceleration. SINCAP values were higher with mean peak door velocity of 11.1 m/sec (mean -1sd=8.4 m/sec). Pelvic acceleration was also higher. However, SINCAP test results had a very wide variation (2.8-13.4 m/sec for door velocity and 19-145 g for peak pelvic acceleration.

The pelvis can become trapped between the incoming door and the console in the case of a fixed, deformable seat and a rigid console relative to the pelvis. Forces are generated in the two cases. The fixed seat results in high door to seat loads and the initial door to pelvis contact force was in the range of $10 \times 10^3$ N. When the pelvis contacted the console, the second force on the pelvis peaked at about $20 \times 10^3$ N. In contrast, with the stiffer translating seat and no console, the initial pelvic contact force was much lower, about $4 \times 10^3$ N and there was no secondary force since there was no pelvic to console contact.

Although the present invention has been described in connection with particular embodiments thereof, it is to be understood that various modifications, alterations, and adaptations may be made by those skilled in the art without departing from the spirit and scope of the invention set forth in the following claims.

What is claimed is:

1. A structure for use in an automobile for protecting an occupant during a near side impact collision, comprising:
    a lateral seat track attached to said automobile and oriented substantially perpendicular to a central longitudinal axis of said automobile,
    an occupant seat operatively coupled to a substantially rigid frame and said lateral seat track such that, during a near side impact collision, an automobile door contacts said substantially rigid frame or said occupant seat, and said substantially rigid frame and said occupant seat translate laterally away from an impacting vehicle and toward said central longitudinal axis, and
    a limiting barrier disposed adjacent to said occupant seat and configured to impede said lateral translation of said occupant seat during said near side impact collision.

2. A structure as recited in claim 1 wherein said substantially rigid frame further comprises a platform on which said seat is mounted, said platform being attached to said lateral seat track.

3. A structure as recited in claim 2 wherein said platform comprises a substantially rigid frame on two or more sides and bottom of said occupant seat.

4. A structure as recited in claim 3 wherein said substantially rigid frame is external to said occupant seat.

5. A structure as recited in claim 3 wherein said substantially rigid frame is internal to said occupant seat.

6. A structure as recited in claim 3 wherein said substantially rigid frame remains intact following a lateral impact force between about 5,000 N and about 15,000 N.

7. A structure as recited in claim 1 wherein said lateral seat track is cantilevered.

8. A structure as recited in claim 1, further comprising a restraint to maintain an occupant within said occupant seat as it translates laterally following said near side impact collision.

9. A structure as recited in claim 8 wherein said restraint is disposed between said occupant and said door, wherein said restraint is hinged to said seat.

10. A structure as recited in claim 8 wherein said restraint is disposed between said occupant and said limiting barrier.

11. A structure as recited in claim 1, further comprising shear bolts to restrain lateral translation of said occupant seat.

12. A structure as recited in claim 11 wherein said shear bolts release following a lateral impact force between about 2,000 N and about 8,000 N.

13. A structure as recited in claim 1 wherein said limiting barrier comprises a center console constructed of a crushable material.

14. A structure as recited in claim 13 wherein said limiting barrier crushes following a lateral impact force between about 5,000 N and about 15,000 N.

15. A system for managing an occupant in an occupant compartment of an automotive vehicle in an event of a near side impact collision, comprising:
    restraint means for maintaining the occupant in an occupant seat during said near side impact collision,
    means for reacting to said collision by laterally displacing said occupant seat toward a center of said occupant compartment and
    means for absorbing laterally directed kinetic energy of said occupant seat, wherein said restraint means is disposed between said occupant and said absorbing means, and said absorbing means is a limiting barrier.

16. A system as recited in claim 15 wherein said means for reacting to said collision further comprises said occupant seat operatively coupled to a substantially rigid frame and a lateral seat track.

17. A system as recited in claim 16 wherein said substantially rigid frame is disposed on two or more sides and bottom of said occupant seat.

18. A system as recited in claim 16 wherein said lateral seat track is cantilevered.

19. A system as recited in claim 15 wherein said restraint means is disposed between said occupant and said door, and said restraint means is hinged to said seat.

20. A system for managing an occupant in an occupant compartment of an automotive vehicle in an event of a near side impact collision, comprising:
    restraint means for maintaining the occupant in an occupant seat during said near side impact collision,
    means for reacting to said collision by laterally displacing said occupant seat toward a center of said occupant compartment and
    means for absorbing laterally directed kinetic energy of said occupant seat, wherein said means for absorbing laterally directed kinetic energy is a limiting barrier and said limiting barrier comprises a center console constructed of a crushable material.

21. A system as recited in claim 15, further comprising shear bolts for restraining lateral translation of said occupant seat.

22. A method for managing an impact load from a near side impact collision comprising:
    attaching a lateral seat track to an automobile, said lateral seat track oriented substantially perpendicular to a central longitudinal axis of said automobile,
    operatively coupling an occupant seat to a substantially rigid frame and said lateral seat track such that, during a near side impact collision, an automobile door contacts said substantially rigid frame or said occupant seat, and said substantially rigid frame and said occupant seat translate laterally away from an impacting vehicle and toward said central longitudinal axis, and
    disposing a limiting barrier adjacent to said occupant seat, said limiting barrier configured to impede said lateral translation of said occupant seat and said substantially rigid frame during said near side impact collision.

23. A method as recited in claim 22 wherein said lateral seat track is cantilevered.

24. A method as recited in claim 22 wherein said limiting barrier comprises a center console of a crushable material.

25. A method as recited in claim 22, further comprising providing an occupant restraint.

26. A method as recited in claim 25 wherein said occupant restraint is disposed between said occupant seat and said door, wherein said restraint is hingedly connected to said seat.

27. A method as recited in claim 25 wherein said occupant restraint is disposed between said occupant seat and said limiting barrier.

* * * * *